United States Patent [19]
Turner et al.

[11] 3,902,600
[45] Sept. 2, 1975

[54] CARTRIDGE TYPE CONTROL VALVE WITH PLASTIC ELEMENTS

[75] Inventors: Warren E. Turner, Succasunna; Arthur C. Homeyer, Essex Fells; Richard C. Dreibelbis, Fairlaw, all of N.J.

[73] Assignee: Emerson Electric Co., St. Louis, Missouri

[22] Filed: Mar. 29, 1974

[21] Appl. No.: 455,516

Related U.S. Application Data

[63] Continuation-in-part of Ser. No. 232,661, March 8, 1972, abandoned.

[52] U.S. Cl. .............. 137/454.6; 137/495; 251/368
[51] Int. Cl.[2] ....................................... F16K 25/00
[58] Field of Search ............ 137/454.2, 454.5, 454.6, 137/495; 251/367, 368; 239/28, 29, 29.3; 92/99

[56] References Cited
UNITED STATES PATENTS

| | | | |
|---|---|---|---|
| 3,003,519 | 10/1961 | Homeyer | 137/454.6 |
| 3,139,898 | 7/1964 | Wiltgen | 137/454.6 |
| 3,448,768 | 6/1969 | Keller | 251/368 X |
| 3,493,010 | 2/1970 | Dreibelbis | 137/454.6 |
| 3,538,942 | 11/1970 | Lyall | 137/454.6 |

*Primary Examiner*—Harold W. Weakley
*Attorney, Agent, or Firm*—Charles A. McClure

[57] ABSTRACT

A cartridge type control valve for replaceable use in the dispensing head of a fluid dispensing system includes, a fluid transfer assembly having a composite fluid transfer chamber means and an inlet duct assembly made of plastic material, the inlet duct assembly includes a longitudinal leg formed integral with the bottom and sidewall of the fluid transfer chamber means and a transfer leg operatively connected to the longitudinal leg and locked to the sidewall to prevent relative rotation thereof, valve means including a valve stem made of plastic material coacting with a valve port formed in the inlet duct assembly to control flow of fluid through the fluid transfer assembly, and an actuating assembly for operating the valve means with a regulator sub-assembly therein having a valve guide made of plastic material disposed for operative connection to the valve stem.

Additionally, the fluid transfer chamber means of the fluid transfer assembly includes, a reinforced cup-like member, an elastomeric diaphragm disposed to lie transversely of the cup-like member to form the fluid transfer chamber therewith, and a cover member, the cup-like member and the cover member having interengaging elements with means thereon to securely clamp the edges of the diaphragm therebetween in assembled position. At least one annular reinforcing element is continuous with the rim of the cup-like member and reinforcing ridges are formed in the bottom or floor of the cup-like member.

Additionally, a method of fabricating the composite fluid transfer chamber means and inlet duct assembly by providing a ridge of welding material on at least one part and subjecting the parts to be welded to ultrasonic frequency until the welding material fuses the parts to be joined together.

6 Claims, 18 Drawing Figures

CARTRIDGE TYPE CONTROL VALVE WITH PLASTIC ELEMENTS

BACKGROUND OF THE INVENTION

This application is a continuation-in-part of copending application Ser. No. 232,661 filed Mar. 8, 1972 now abandoned.

This application relates generally to fluid dispensing systems and more particularly to a cartridge type control valve for use in the dispensing head for such systems having a substantial number of elements therein made of plastic material.

In U.S. Pat. No. 3,493,010 a review was made of prior art cartridge type control valves used in the dispensing head of fluid dispensing systems as shown in U.S. Pat. Nos. 1,793,292; 2,868,233; 3,089,510 and 3,003,519 and the problems concerning cost of the materials used in such prior art control valves and the problems of manufacture and assembly with such materials was fully set forth.

In U.S. Pat. No. 3,493,010 a control valve was disclosed having a multi-part fluid transfer assembly forming respectively the fluid transfer chamber and inlet duct, made of plastic, which coated with an associated valve actuating means. This control valve was an assembled or built up arrangement. Accordingly, it required a sufficiently different mounting bore in the dispensing head to the extent that the control valve of U.S. Pat. No. 3,493,010 could not be easily mounted in the existing castings or forgings of dispensing heads adapted to receive the prior art type cartridge control valves nor could it be substituted as a replacement part for existing prior art cartridge type control valves when replacement due to defects or other causes was required.

The present invention relying on new methods of manufacture which are applicable to plastic materials is directed to an improved cartridge type control valve having elements which are fabricated of such plastics and can be assembled into an integral unit fully interchangeable with existing prior art cartridge type control valves made of other and more expensive materials, and adapted for use in existing forms of dispensing heads without requiring substantial changes in the castings or forgings of said dispensing heads in order to receive the cartridge type control valves in accordance with the present invention.

The applicant's device is cheaper to make because methods for fabricating plastic elements are used in the manufacture thereof and more particularly in the formation of the fluid transfer assembly which allows for reduction both in the cost of materials and the cost of labor in making and assembling the control valve.

Additional advantages of the improved cartridge type control valve disclosed herein are that it is lighter in weight and hence the shipping charges will be less when these devices are shipped in quantities, it is substantially chemically inert and therefor resists corrosion and it has other improved physical properties.

SUMMARY OF THE INVENTION

Thus, the present application covers a cartridge type control valve adaptable for use and for replaceable mounting in the dispensing means of a fluid dispensing system which comprises a fluid transfer assembly including a composite fluid transfer chamber means and an inlet duct assembly made of plastic material, the inlet duct having a longitudinally leg and a cantilevered transverse leg the longitudinal leg is formed continuous and as part of the bottom and side walls of the fluid transfer chamber means and defines an inlet for fluid, the transverse leg is operatively formed as by ultrasonic welding to the longitudinal leg and operatively engages with the side wall of the fluid transfer chamber, the transverse leg has passage means therethrough communicating at one end with the inlet for fluid and at the other end provides an outlet port into the fluid transfer chamber means of the fluid transfer assembly for the fluid to be dispensed, valve means including a valve stem made of plastic material is disposed to normally maintain the outlet port closed, and an actuating assembly coacts with the valve means to regulate and control the flow of fluid to be dispensed from the control valve.

The present application also covers a method for manufacturing the fluid transfer assembly, including the steps of forming the fluid transfer chamber means and longitudinal leg as a single unit of plastic material having reinforcing means, and ultrasonically welding a transverse leg of plastic material to the longitudinal leg and the side wall of the fluid transfer chamber means to form the inlet duct assembly for the control valve.

Thus, the present application also covers a fluid transfer chamber means made of plastic material for the fluid transfer assembly of a cartridge type control valve which includes, a cup-like member with a closed bottom and side wall means continuous with the bottom to form an open end remote from the bottom having an upper rim, means reinforcing the bottom of said cup-like member, means reinforcing the side wall of aid cup-like member with at least one portion thereof continuous with the upper end, and an inlet duct assembly formed and continuous with the bottom and a portion of the side wall means of the cup-like member.

The present application covers a fluid transfer chamber means for the fluid transfer assembly of the cartridge type control valve having a reinforced cup-like member made of plastic material with an upper rim about the open end thereof, an elastomeric diaphragm disposed transversely of the fluid transfer chamber means with its peripheral edges in engagement with the upper rim of the cup-like member to define a fluid transfer chamber, and a cover member made of plastic material having a lower rim at least a portion of which is adapted to mate with said upper rim and means to hold and seal the diaphragm between the lower rim of the cover member and the upper rim of the cup-like member in assembled position.

Further, objects and advantages of the invention will become apparent from a study of the following specification taken in connection with the accompanying drawings in which.

Figure 1:
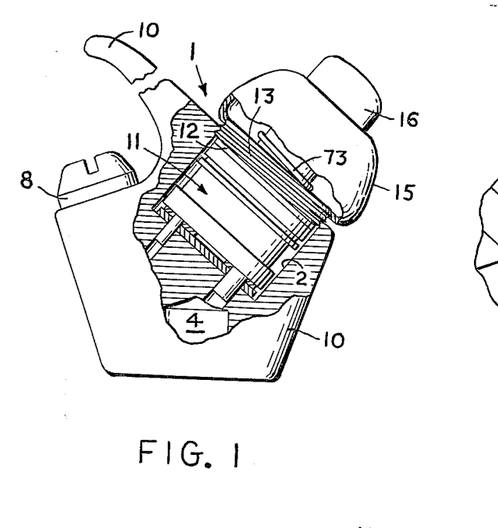
FIG. 1 is a side view of a dispensing head for a fluid dispensing system such as a water cooler partially in vertical section to show in side elevation a cartridge type control valve in accordance with the present invention in assembled position therein.
Figure 2:
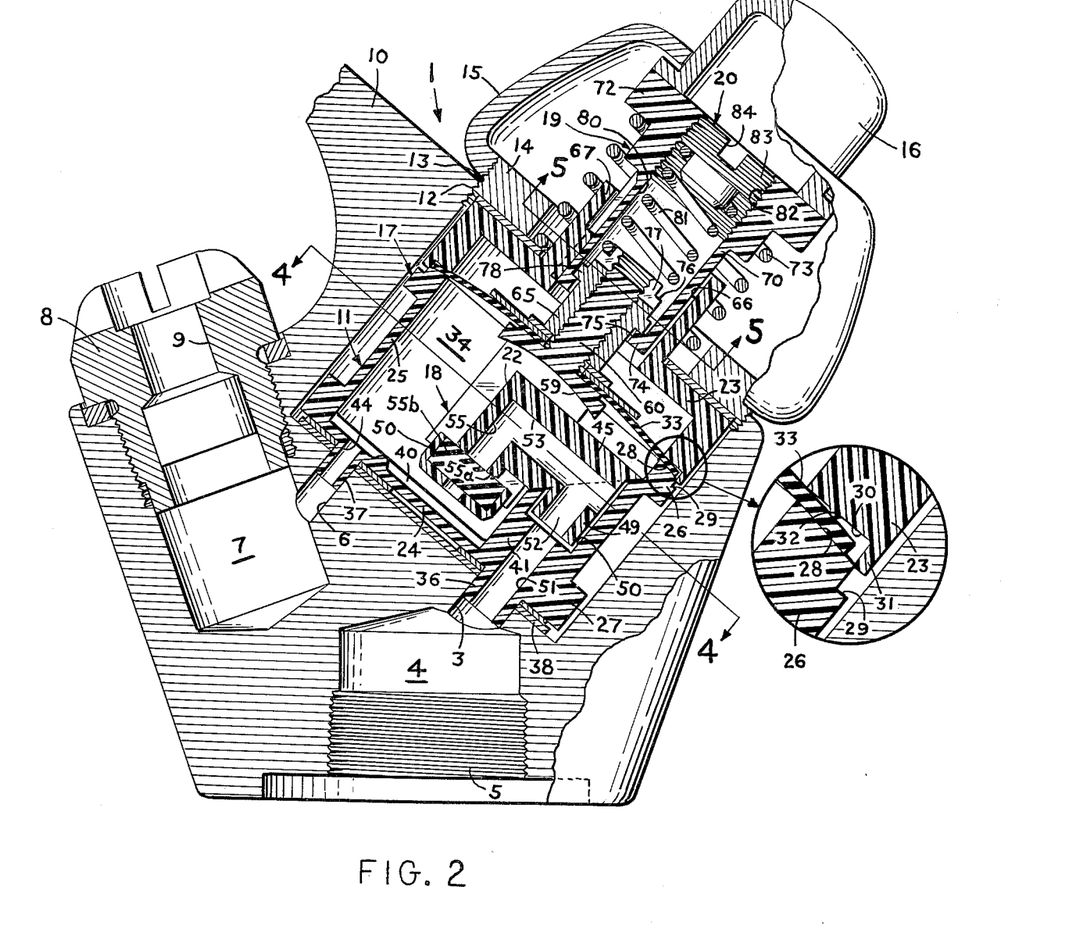
FIG. 2 is a vertical cross-section of the dispensing head and the cartridge type control valve in accordance with the present invention shown in FIG. 1.

Referring to the drawings FIGS. 1 and 2 show a conventional dispending head 1 of the push buttom type which is used in well-known fluid dispensing devices such as the water coolers found in offices, industrial plants, public buildings, etc.

These dispensing heads have been generally standardized to receive a cartridge type control valve of the type referred to and shown in the prior art devices above described.

Since literally hundreds of thousands of these dispensing heads have been used and many thousands more will be used it is thought clear that there is not only a market for newly manufactured control valve units which fit such dispensing heads but additionally a large market for replacement units to repair defective control valves or for use in the rebuilding of entire dispensing heads.

Additionally, because of the cost of redesign and the retooling required, manufacturers of fluid dispensing devices and fluid dispensing systems which utilize such dispensing heads are most reluctant to change existing designs without great cost reduction incentive. This means that any improved control valve must be designed so they can be substituted for or can replace the known prior art type control valves.

The improved cartridge type control valve of the present invention described hereinafter meets all of the exacting requirements for overcoming these and other problems.

Thus, in FIGS. 1 and 2 the conventional casting or forging now in use for forming the dispending head 1 is shown as having a central bore 3 with an inlet opening 4 threaded as at 5 for communication with a sourse of fluid to be dispensed (not shown). A second bore 6 connects the cavity 2 with a chamber 7 which supplies fluid to the dispensing nozzle 8 having a dispensing outlet 9. The nozzle is detachably connected into the dispensing head 1 adjacent a water deflector or shield 10.

To control the flow of water or other fluid to be dispensed by the dispensing head 1 a cartridge type control valve 11 in accordance with the present invention is shown as adapted for use in and for replaceable mounting in cavity 2 of the dispensing head 1.

Control valve 11 is held in cavity 2 by interengaging threaded means as at 12 in the open or mouth end of cavity 2 and 13 on locking nut 14 which in assembled position will bear against the upper end of the control valve 11.

FIGS. 1 and 2 show that the lock nut 14 uses only a portion of the threaded means 13 to hold the control valve in assembled position. The remaining portion of the threads receive the push button retainer 15 within which is slidably disposed a push button 16 which in non-actuating position is in loose engagement with an actuating assembly on the control valve 11.

CONTROL VALVE

Control valve 11 is of the cartridge type in that it is insertable and removable from the cavity 2 as a single integral unit.

As shown in FIG. 2 control valve 11 includes broadly a fluid transfer assembly generally designated 17, valve means 18 to control the flow of fluid through the fluid transfer assembly 17 and the actuating assembly 19 for the valve means which is operatively associated with the push button 16.

The actuating assembly 19 includes a regulator sub-assembly 20 similar to those shown in prior art cartridge type control valves.

The control valve 11 herein described is characterized by the fact that the improved construction permits a substantial number of those parts of the control valve which have heretofore required special materials and machining of the parts to close tolerances to now be formed from plastic or plastic like materials and thus to be fabricated and assembled by relatively simple techniques so that the costs of such parts and control valves made therefrom can be materially decreased.

Certain parts such as the springs, nuts, washers, etc. are at present made so cheaply that there is no need for converting these over to plastic parts and to the extent that these elements are used the control valve of the present invention is not an all plastic device. Where applicable those parts as hereinafter described that are plastic are preferably made of durable and machinable plastics or plastic like materials such as those sold under the trademark "Celcon" or "Delrin" which products are made of fluorocarbon resin materials classified as acetal copolymers. Therefor when the word plastic or plastic material is used herein it will be understood to mean materials of this type.

However, while these materials have been designated it will be understood by those skilled in this art that any type of plastic material or resinous material or the like type material may be used for these elements provided that the physical properties of such materials provide non-water absorption; adaptability to hot and cold systems; tensile strength and dimensional stability. Any thermal plastic or thermal setting material meeting these requirements which remains stable and is not adversely affected by constant exposure to air or water between the normal operating and shipping temperatures of −10°F to +180°F to which the control valves may be subjected can be utilized for the plastic parts and assemblies of the control valve described herein, and more particularly for those assemblies designed for handling the transfer of the fluid to be dispensed by the systems in which the control valve will be used.

FLUID TRANSFER ASSEMBLY

Referring to FIGS. 3 to 8 the fluid transfer assembly 17, is shown as having plastic elements including, a composite reinforced fluid transfer chamber means 21 and inlet duct assembly generally designated as 22, and a coacting cover member 23.

The fluid transfer chamber means 21 of the fluid transfer assembly 17 is formed by the plastic cup-like reinforced fluid transfer chamber means 21, an elastomeric diaphragm member 33 and a plastic cover member 23. When these elements are assembled as shown in FIGS. 1 and 2 and more fully described hereinafter the fluid transfer assembly 17 has a generally cylindrical shape in side elevation. Fluid transfer assembly 17 will be sized to fit loosely into the cavity 2.

Plastic cup-like fluid transfer chamber means 21 is formed with a bottom 24 and an annular side wall 25 which defines an opening remote from the bottom 24. Further, the upper edge or rim 28 about the opening is so formed that at least a portion of the surface thereof is in a plane at an obtuse angle at all points therealong with the longitudinal line of the fluid transfer assembly 17. On the outer wall of the annular side wall 25 reinforcing ribs 26 and 27 are circumferentially disposed in spaced relation to each other about the respective upper and lower ends of the cup-like member 2.

This upper edge is continuous with an external groove or countersurface 29 formed adjacent the upper edge above the strengthening rib 26 which is disposed a spaced distance from the upper edge or rim 28.

The cover member 23 is provided with a lower edge or rim as at 30 with an annular depending portion 31 disposed about the lower edge or rim 30 which in assembled position will engage the external groove or countersurface 29.

Spaced from either side of the lower edge or rim 30 is a gripping bead 32. When the cover assembly 23 is assembled on the cup-like member 21 the portion of the angled upper rim 28 and the gripping bead 32 will act to securely hold and seal the peripheral edge of the resilient elastomeric diaphragm 33 therebetween.

The assembled unit of the plastic cup-like fluid transfer chamber means 21, the elastomeric diaphragm 33 and the plastic cover member 23 act to form the fluid transfer chamber 34 in the fluid transfer assembly 17.

Further, the fluid transfer chamber means 21 has a first downwardly extending projection 36 and a second downwardly extending projection 37. When the control valve 11 is in cavity 2 the respective projections 36 and 37 will engage the first bore 3 and the second bore 6, and will serve to prevent relative rotation of the control valve 11 in assembled position.

A gasket member 38 between the outer face of the bottom 24 and the inner face of the bottom of the cavity 2 will establish a fluid tight connection about the projections 36 and 37 of the control valve 11.

Figures 3, 4, 5, 6, 7, 8, 9, 10:
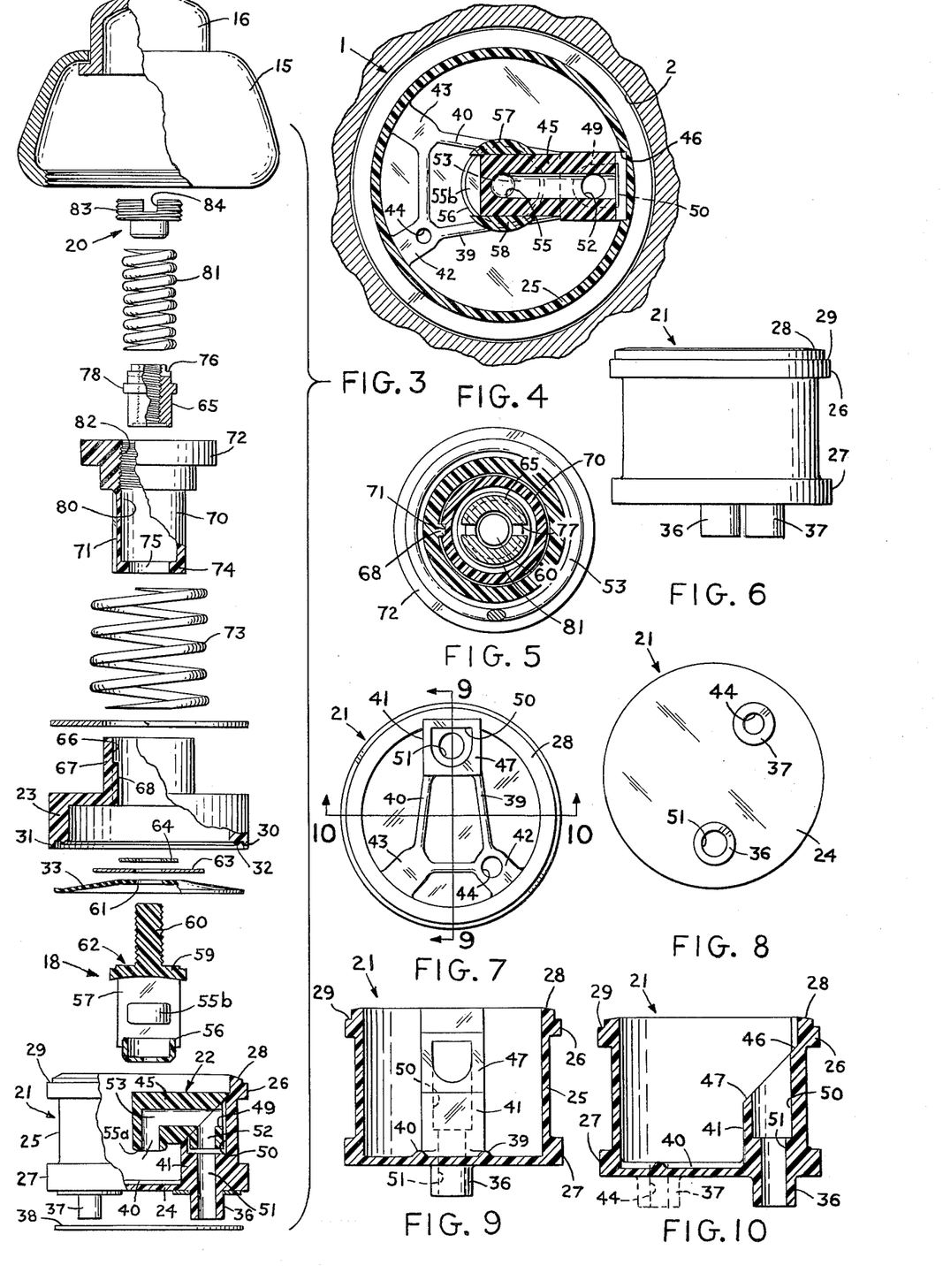
FIG. 3 is an exploded view of the various components of the plastic control valve in accordance with the present invention partly in side elevation and partly in vertical section.
FIG. 4 is a cross-section taken on line 4—4 of FIG. 2.
FIG. 5 is a cross-section taken on line 5—5 of FIG. 2.
FIG. 6 is a side elevation of the cup-like member of the fluid transfer chamber means.
FIG. 7 is a top plan view of the cup-like member of the fluid transfer chamber means shown in FIG. 6.
FIG. 8 is a bottom plan view of the cup-like member of the fluid transfer chamber means shown in FIG. 6.
FIG. 9 is a vertical section taken on line 9—9 of FIG. 7 showing the longitudinal leg of the inlet duct assembly and the locking groove in the side wall before the transverse leg of the inlet duct assembly is ultrasonically welded into position.
FIG. 10 is a vertical section taken on line 10—10 of FIG. 7 showing a front view of the position of the inner surface of the side wall of the fluid transfer chamber with the associated longitudinal leg of the inlet duct assembly and the locking groove in the side wall before the transverse leg of the inlet duct assembly is ultrasonically welded into position.
Figure 11:
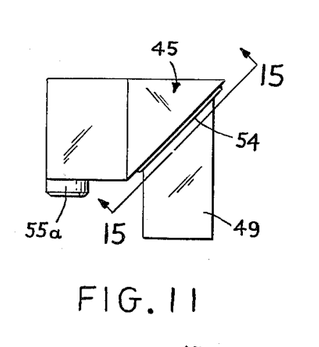
FIG. 11 is a side view of the transverse leg of the inlet duct assembly showing the bead of material thereon used for ultrasonic welding of the transverse leg to the longitudinal leg.
Figure 12:
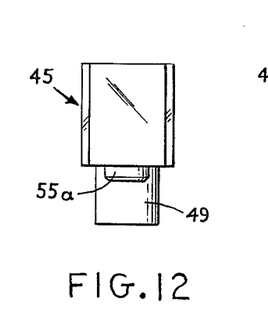
FIG. 12 is a front view of the transverse leg of the inlet duct assembly.
Figure 13:
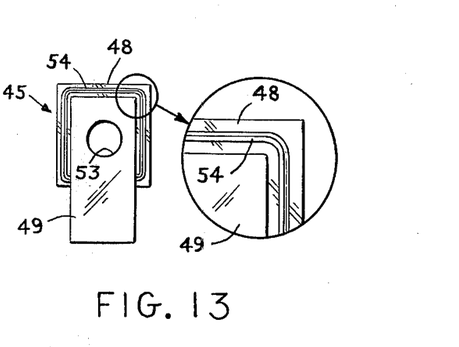
FIG. 13 is a back view of the transverse leg of the inlet duct assembly, and an enlarged view of a fragment of the transverse leg showing the extra bead of plastic material used for ultrasonically welding the transverse leg into assembled position.
Figures 14, 15, 16, 17:
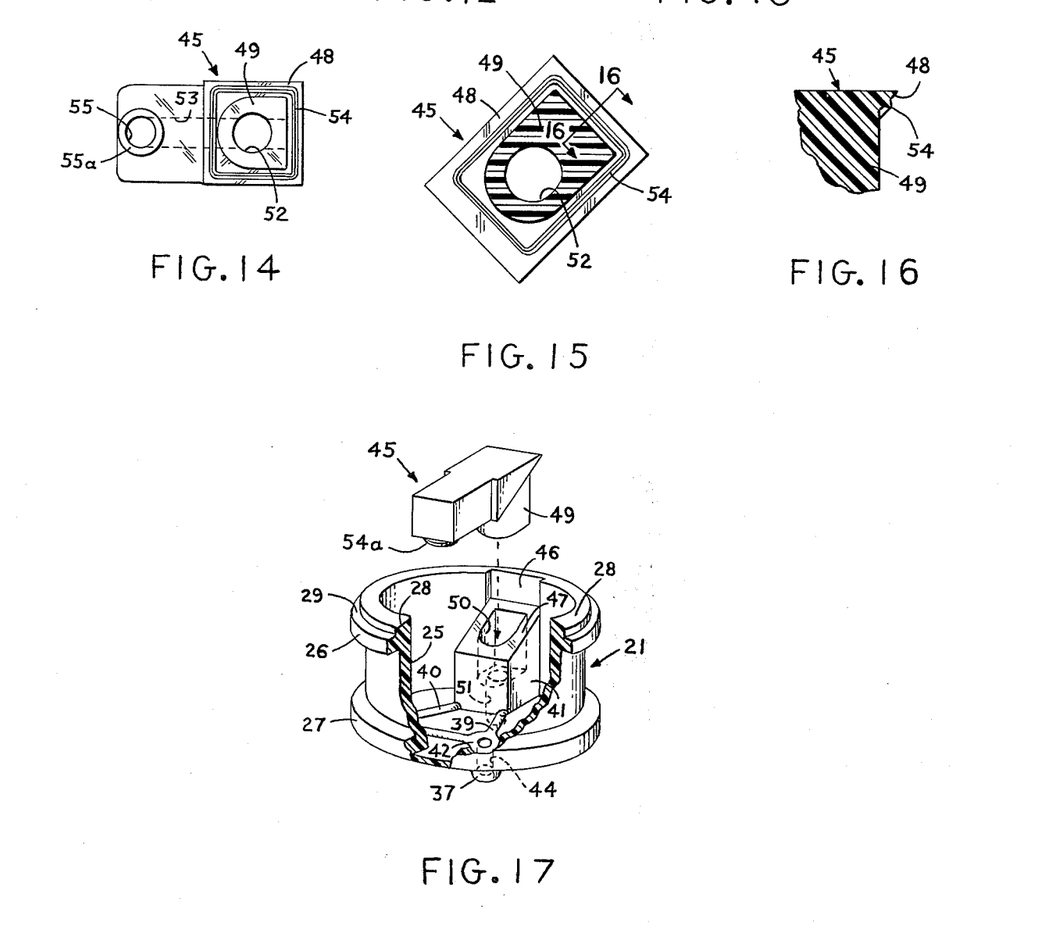
FIG. 14 is a bottom view of the transverse leg of the inlet duct assembly.
FIG. 15 is a view taken on line 15—15 of FIG. 11.
FIG. 16 is a vertical sectional view taken on line 16—16 of FIG. 15.
FIG. 17 is an exploded perspective view of the fluid transfer chamber means and the inlet duct assembly with a fragment thereof in partial vertical section to show the reinforcing means on the side wall and the bottom and the associated transverse leg before it is ultrasonically welded to the longitudinal leg of the inlet duct assembly.
Figure 18:
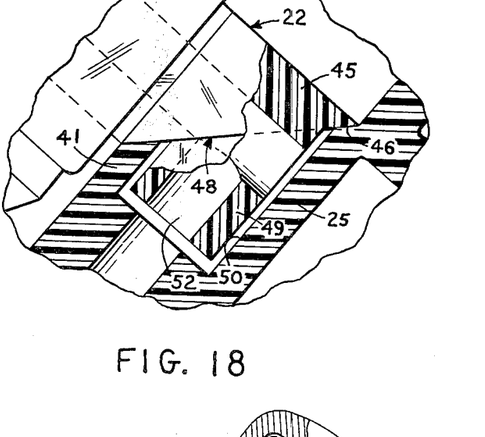
FIG. 18 is an elongated side view of a portion of the inlet duct assembly partly in vertical section showing the transverse leg after it has been ultrasonically welded to the longitudinal leg shown in FIG. 17.

The inner surface of the bottom 24 of the cup-like fluid transfer chamber means 21 will be formed with supporting or strengthening ribs as at 39 and 40 which ribs connect at one end to respective sides of the longitudinal leg 41 of the inlet duct assembly 22 and at their respective other ends to thickened sections or lands 42 and 43 as is shown in FIGS. 4 and 7 of the drawings.

The downwardly extending projection 37 will be positioned so that an outlet passage or port 44 can be formed to extend from the fluid transfer chamber 34 through the downwardly extending projection 37. Thus, when control valve 11 is in assembled position and fluid is to be dispensed, it can flow freely from the fluid transfer chamber 34 and outlet port 44 through outlet 6 discharge chamber 7 to the dispensing outlet 9 in the dispensing nozzle 8, as will appear clear by reference to FIGS. 1, 2 and 4 of the drawings.

The outlet passage or port 44 will be sized relative the inlet passages for the fluid to be dispensed to control the volume of fluid dispensed from the control valve as will be understood by those skilled in the art.

The inlet duct assembly 22 will be made of plastic and in assembled position is disposed in the fluid transfer chamber 34 of the fluid transfer chamber means. It includes the longitudinal leg 41 and a transverse leg 45 generally cantilevered as shown in FIGS. 2, 3, 4 and 17 of the drawings for reasons that will appear clear from the description which follows below.

The integral joining of the inlet duct assembly 22 to the plastic cup-like fluid transfer chamber means is accomplished by first fabricating the longitudinal leg portion 41 with the cup-like transfer chamber means 21 as a single plastic unit. Then the plastic transverse leg is ultrasonically welded not only to the longitudinal leg portion 41, but simultaneously it is fixed or welded in a locking groove 46 provided in the side wall of the cup-like chamber means 21 so as to prevent relative rotation of the cantilevered transverse leg 45 with respect to the longitudinal leg 41 of the inlet duct assembly.

In the formation of the cup-like member 21 and longitudinal leg unit 41, the longitudinal leg is integrally connected to the bottom 24 in the vertical or longitudinal line of the projection 36 and to the adjacent side wall so that it extends upwardly along a portion of the inner surface of the side wall 25 a predetermined distance as is required for fitting the transverse leg 45 into assembled position, as is shown in FIGS. 2, 3, 4, 9, 17 and 18 of the drawings.

FIGS. 2, 3, 4, 9, 10, 17 and 81 show that the uppermost end or surface 47 of the longitudinal leg 41 is beveled at approximately a 45° angle. At the uppermost end there is formed into the inner surface of the side wall the locking groove or inset 46, the lower portion of which is continuous with the uppermost end or surface 47 of the longitudinal leg 41.

Transverse leg 45 is an elongated member which is preferably square in cross section. The end or beveled surface 48 to be welded is at a 45° angle so that it will snugly engage the uppermost end or surface 47 of the longitudinal leg 41. Extending in a direction normal to the longitudinal line of the transverse leg 45 and medially along the beveled surface 48 is a shaped projection 49 which in assembled position will lie in the shaped countersunk bore 50 in the inlet passage 51 formed in longitudinal leg 41. The projection 49 is provided with a passage 52 therein which communicates with the connecting passage 53 extending along the longitudinal line of the transverse leg 45.

Further, the transverse leg is sized so that when it is put in position for weldment to the longitudinal leg it will not only cover the uppermost end or surface 47 but further will extend into and engage the lower portion of the inset or locking groove 46.

The 45° face of the end or beveled surface 48 of the transverse leg 45 is further formed initially with a bead of plastic material as at 54 just inwardly of the side edges thereof. Bead 54 is in a continuous circumferential pattern to provide the necessary plastic material for welding the transverse leg 45 to the longitudinal leg 41, to provide the composite plastic reinforced fluid transfer chamber means and inlet duct assembly for the fluid transfer assembly 17 of the control valve.

In order to weld the transverse leg 45 to the longitudinal leg 41, the cup-like chamber means 21 is placed into any suitable jig for holding this member while the ultrasonic frequency welding is applied. This is accomplished by placing the transverse leg 45 in a suitable jig so that the ultrasonic frequency can be transmitted through the transverse leg 45 and it can be moved under pressure into engagement with the uppermost end 47 of the longitudinal leg 41 and lower portion of the locking groove or inset 46.

The plastic welding bead 54 acts to concentrate the energy of the ultrasonic frequency and as heat and pressure are developed welding occurs by fusion of the respective parts.

The ultrasonic frequency welding of plastic parts together is well known in the plastic art and accordingly requires no additional description other than to note that it is particularly adaptable to the formation of the plastic elements of the control valve 11 in accordance with the present invention.

When so welded to the longitudinal leg 41, the cantilevered transverse leg 45 which has a length approximately three-quarters of the diameter of the fluid transfer chamber 34 will be disposed a spaced distance from the bottom 24 and will extend from the side wall 25 into fluid transfer chamber 34 along a radial line which intersects the center or vertical line of the control valve 11.

Inlet duct assembly 22 of the fluid transfer assembly 17 thus can provide means for passing fluid to be dispensed to the fluid transfer chamber 34 as will now be described. Since the longitudinal leg 41 is disposed in the longitudinal line and is continuous with the first downwardly extending projection 36, the inlet passage 51 can be formed in the longitudinal leg 41 so as to communicate at one end with the inlet opening 4 and at the end remote therefrom with the connecting passages 52 and 53 formed in the transverse leg 41. Similarly, in the wall of the transverse leg 45 at the point thereof which intersects the center or vertical line of the fluid transfer chamber 34, a valve port 55 will be formed in the lower or downward side of the wall of the transverse leg 45, that is, the side facing the bottom 24 of the cup-like member 21. Valve port 55 will communicate at the upper or inner end with the connecting passage 53 and at the lower or outer end has an opening which communicates with the fluid transfer chamber 34. A valve port 55a is formed on the transverse leg 45 about said lower opening of valve port 55.

Thus fluid from the source can pass through inlet opening 4 through the inlet passage 51, counter bore 50, connecting passage 52 and 53 to the valve port 55 and whether the valve port 55 is open or closed will determine whether or not fluid passes into the fluid transfer chamber 34.

To control the flow of fluid into fluid transfer chamber 34, valve means 18 is provided.

VALVE MEANS

Valve means 18 for controlling the flow of fluid from the inlet 4 into the fluid transfer chamber 34 includes a valve head 55b which is an elastomeric member disposed for movement towards and away from the valve seat 55a.

The valve head 55b is held in a plastic valve head holder 56 which is connected to one end of a pair of spaced legs 57 and 58 formed on a plastic yoke member or stirrup 59. Leg members 57 and 58 are so spaced that they fit snugly about the transverse leg 45 of the inlet duct assembly 22 to permit the yoke member or stirrup 59 to move to and fro along the centerline or longitudinal axis of the control valve 11, and of the fluid chamber means 34 normal to the longitudinal line of the transverse leg 45.

A plastic valve stem 60 is connected to or preferably formed integral with the plastic yoke 59 at the end remote from the point where the plastic valve head 55b is mounted. It extends upwardly through a medially disposed opening 61 in the diaphragm member 33 and is connected with the actuating assembly 19 for actuating the valve means 18, all of which is shown in FIG. 2 and 3 of the drawings.

By reference to FIG. 2 and 3 the opening 61 is shown as being maintained fluid tight between the flat upper shoulder 62 of the yoke or stirrup member 59 on the one side and a diaphragm disc 63 and lock washer 64 on the other side by means of a connecting member 65 threadably mounted on the valve stem 60 which also provides a lost motion connection between the valve means 18 and the actuating assembly 19.

The actuating assembly 19 is slidably disposed in an elongated bore 66 formed by an elongated longitudinally extending annular member 67 on cover member 23, so disposed that when the cover member is in assembled position the elongated longitudinally extending annular member will be concentric with the center line or longitudinal line of the control valve 11.

The elongated bore 66 is formed by the inner wall of the annular member 67 and formed on the inner wall or bore 66 parallel to the center line of the control valve is a projection or guide 68.

The actuating assembly 19 as is hereinafter described will be disposed for engagement with the projection 68 to prevent rotation of the actuating assembly 19 relative to the fluid transfer assembly 17 so that the setting of the regulator sub-assembly 20 therein will not be modified or changed when the actuating assembly is moved to and fro for moving the valve means during operation of the control valve 11.

ACTUATING ASSEMBLY

In FIG. 2 and 3 the actuating assembly 19 is shown to icnlude, a tubular spring housing 70 which is also made of plastic material and is sized so that it can be mounted for sliding movement in the elongated bore 66. A guiding groove 71 is formed on the outer wall of the tubular spring housing 70 so that in assembled position as shown in FIG. 2 the guiding groove will be in continuous engagement with the projection 68 formed on the inner wall or elongated bore 66.

The upper end of spring housing 70, that is the end remote from the fluid transfer assembly 17 is provided with an outwardly extending flange 72. When the spring housing 70 is assembled in its operating position a return spring 73 will be mounted about the annular member 67 and spring housing 70 so that it is contained between the cover member 23 at one end and the outwardly extending flange 72 at the opposite end. When pressure is exerted on this flanged end of the spring housing 70 to move it into the elongated bore 66, the spring 73 will expand to return the spring housing 70 to the position shown in FIG. 2.

The end of the spring housing remote from the upper flange 72 is provided with a lower inwardly extending flange or shoulder 74 which has an opening 75 therethrough for mounting the valve stem connecting member 65 which also forms a range spring seat as at 76.

A slot 77 at the upper end of the connecting member 65 will permit this member to be threaded into full engagement with the valve stem 60 so as to hold the diaphragm disc 63 and lockwasher 64 in position to provide the fluid tight seal about the medially disposed opening 61 in the diaphragm member 33 as above described.

As is clear from FIG. 2 of the drawings the connecting member 65 is sized to fit loosely in the opening 75 formed in the inwardly extending flange 74 of the spring housing 70, and that the greater length of the connecting member 65 permits it to move freely with respect to the movement of the spring housing 70. An annular flange 78 formed about the top of the connecting member 65 provides an upper stop engagement with the inwardly extending flange 74. In the position as shown in FIG. 2 of the drawings the return spring 73 is disposed to force the spring housing 70 of the actuating assembly 19 so that the inwardly extending flange 74 will engage annular flange 79 and move the valve stem 60 and all the elements of the valve means connected thereto so that the valve head 55 will engage the valve seat 55a to maintain the valve port 55 normally closed.

In the bore 80 formed by the tubular spring housing 70 a range spring 81 is disposed so that one end engages the range spring seat 76 on the connecting member 65. The bore is threaded as at 82 so that a range spring set screw 83 can be threaded therein and disposed for engagement with the range spring 81 remote from the end in engagement with the connecting member 65. The range spring set screw 83 is provided with a slot 84 which permits the screw 83 to be threaded inwardly and outwardly along the longitudinal line of the range spring 81 to set the desired tension on the range spring for operative association with the return spring 73 of the actuating assembly 19.

OPERATION

When the control valve 11 is assembled as shown in FIG. 2 the return spring 73 will normally hold the spring housing of the actuating assembly 19 so that the inwardly extending flange 74 engages the annular flange 78 on the connecting member 65 to force the valve means 18 connected thereto to maintain the valve head 55b in engagement with the valve seat 55a. In this position, the valve port 55 is maintained normally closed.

When the force is exerted at the upper end of the spring housing as by manually depressing the push button 16 which is disposed in engagement with the upper end of the spring housing 70 it will be moved along the centerline of the control valve 11 so that the inwardly extending flange 74 will tend to disengage from the annular flange 78 of the connecting member 65.

Since the elements of the valve means 18 are connected to the connecting member 65 the pressure of the fluid acting in the valve port 55 will lift the valve head 55b off the valve seat 55a and fluid will flow from the inlet 4 through inlet passage 3, connecting passages 51, 52 and 53 to valve port 55 into the fluid transfer chamber 34.

Since the fluid transfer chamber 34 communicates with the discharge outlet 9 as above described, fluid will immediately flow through the outlet port 44, outlet passage 6, discharge chamber 7 and out through the discharge outlet 9 in the nozzle 8 in the dispensing head 1.

By adjusting the range spring set screw the maximum height that the fluid will be discharged through the discharge opening can be adjusted. This type regulator means is well known in the art and accordingly will not be described more fully herein.

When the force is exerted on the upper end of the spring housing 70 so as to move it axially along the centerline to open the valve port 55, the return spring 73 will be compressed. When the force exerted against the upper end of the spring housing is released the return spring 73 will expand to force the spring housing 70 to move so that the inwardly extending flange 74 engages the annular flange 78 on the connecting member 65 and causes the valve means 18 to return to the normally closed position, thus cutting off the delivery of fluid to the discharge outlet 9.

The opening and closing of the valve port is repeated in the same manner as above described to control the flow of fluid from the inlet 4 to the discharge outlet 9 in the dispensing head 1.

The cartridge type control vlave which has been described is adaptable to replace the known prior art devices. However, it differs from those known devices in that a substantial number of the parts are maade of plastic. Such plastic parts are not only different from those in the prior art devices but further such parts can be made of cheaper materials by simpler fabrication techniques and are easier to assemble then the parts required for prior art control valves for accomplishing the same result. As a result an improved control valve is provided which is cheaper to manufacture and provides other benefits because of the chemically inert materials used therein.

It will be understood that the invention is not to be limited to the specific construction or arrangement or parts shown but thaat they may be widely modified within the invention defined by the claims.

What is claimed is:

1. A cartridge type control valve for replaceable use in a fluid dispensing system comprising:
   a. a fluid transfer assembly including, a composite fluid transfer chamber means and inlet duct assembly of all plastic material for forming a fluid chamber having an outlet for fluid to be dispensed,
   b. said fluid transfer chamber means including a bottom and side wall means,
   c. at least one locking means in the side wall of said fluid transfer chamber means operatively associated with the inlet duct assembly,
   d. said inlet duct assembly having a longitudinal leg and a transverse leg,
   e. the longitudinal leg formed with and as part of the fluid transfer chamber means having an inlet passage means connected to the source of fluid to be dispensed,
   f. said transverse leg is ultrasonically welded to the longitudinal leg and to the locking means in the side wall of the fluid transfer chamber means to prevent relative rotation of the transverse leg in assembled position,
   g. said transverse leg having a connecting passage therein communicating at one end with the inlet passage means in the longitudinal leg,
   h. valve port means in the transverse leg communicating at one end with the connecting passage and at the other end disposed to deliver fluid to be dispensed to the fluid chamber formed in the fluid transfer chamber means,
   i. valve means including, a valve stem made of plastic material and an elastomeric valve head therein disposed to coact with the valve port to control flow of fluid to be dispensed into the chamber of the fluid transfer chamber means, and
   j. an actuating assembly having a spring housing made of plastic material operatively connected to the valve stem for actuating the valve means to open and close the valve port.

2. In a cartridge type control valve as claimed in claim 1 including, means reinforcing the bottom and the side wall means of the fluid transfer chamber means.

3. In a cartridge type control valve as claimed in claim 2 wherein the means reinforcing the bottom of the fluid transfer chamber means includes,
   a. a plurality of strengthening ribs and lands formed on the bottom of the fluid transfer chamber means,
   b. said ribs connected at one end to the longitudinal leg and at the other end remote therefrom to at least one land, and
   c. at least one land having an outlet extending therethrough for said control valve sized relative said valve port to control the volume of fluid dispensed by said control valve.

4. In a cartridge type control valve as claimed in claim 2 wherein,
   a. said side wall means having an upper edge defining an opening remote from the bottom of the cup-like member,
   b. the upper edge of said side wall means forming a rim about said opening,
   c. an elastomeric diaphragm member having its peripheral edges disposed to engage the rim of the cup-like member in assembled position,
   d. a cover member having an annular rim, and,
   e. means operatively associated with the cover member and cup-like member to hold and seal the diaphragm in assembled position to form the chamber in the fluid transfer chamber means.

5. In a cartridge type control valve as claimed in claim 4 wherein the means operatively associated with the cover member and the cup-like member includes;
   a. the rim of the cup-like member being disposed in a plane at an angle to the longitudinal line of the control valve, and
   b. a ridge on the annular rim of the cover member disposed during assembly to engage and clamp the peripheral edges of the diaphragm against the angled surface of the rim of the cup-like member.

6. In a cartridge type control valve as claimed in claim 2 wherein the fluid transfer chamber means further includes;
   a. means forming a plurality of reinforcing ribs on the outer surface of the side wall means,
   b. at least one of said ribs disposed a spaced distance from the rim of the side wall means to define a groove adjacent to the upper edge of the side wall means; and
   c. the cover member having a projecting annular wall means about the annular rim disposed to engage the groove when the cover is assembled to the cup-like member.

* * * * *

UNITED STATES PATENT AND TRADEMARK OFFICE
CERTIFICATE OF CORRECTION

PATENT NO. : 3,902,600

DATED : September 2, 1975

INVENTOR(S) : Warren E. Turner, Richard C. Dreibelbis and Arthur C. Homeyer

It is certified that error appears in the above-identified patent and that said Letters Patent are hereby corrected as shown below:

On the cover page the name of the Attorney, Agent or Firm should be changed from "Charles A. McClure" to --DANIEL H. BOBIS--.

Signed and Sealed this

*thirtieth* Day of *December 1975*

[SEAL]

Attest:

RUTH C. MASON
*Attesting Officer*

C. MARSHALL DANN
*Commissioner of Patents and Trademarks*